United States Patent
Hyung et al.

(10) Patent No.: US 8,451,400 B1
(45) Date of Patent: May 28, 2013

(54) LIGHT GUIDE PANEL AND LIQUID CRYSTAL DISPLAY APPARATUS HAVING PARTICULAR LIGHT-EMITTING PATTERN SURFACE

(71) Applicant: Samsung Electronics Co., Ltd., Suwon-si (KR)

(72) Inventors: Sin-wook Hyung, Buk-gu (KR); Dae-hee Lee, Hwaseong-si (KR); Myung-ryul Jung, Hwaseong-si (KR); Do-hyeon Baek, Yongin-si (KR); Kil-hong Lee, Seongnam-si (KR); Hyeong-sik Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/693,487

(22) Filed: Dec. 4, 2012

(30) Foreign Application Priority Data

Jun. 8, 2012 (KR) .......................... 10-2012-0061590

(51) Int. Cl.
*G02F 1/1335* (2006.01)
(52) U.S. Cl.
USPC .................................. 349/65; 349/63; 349/61
(58) Field of Classification Search
USPC ................................................ 349/65, 63, 61
See application file for complete search history.

(56) References Cited

U.S. PATENT DOCUMENTS

| 8,210,730 | B2 * | 7/2012 | Kurata et al. | 362/606 |
| 2010/0296021 | A1 | 11/2010 | Jung et al. | |
| 2011/0170036 | A1 * | 7/2011 | Ishikawa et al. | 349/65 |

FOREIGN PATENT DOCUMENTS

| EP | 2259103 | 12/2010 |
| JP | 2002-175713 | 6/2002 |
| JP | 2004-37982 | 2/2004 |
| KR | 10-2010-0126984 | 12/2010 |
| KR | 10-2011-0083490 | 7/2011 |

OTHER PUBLICATIONS

Korean Notice of Preliminary Rejection issued Dec. 20, 2012, in corresponding Korean Patent Application No. 10-2012-0061590.

* cited by examiner

*Primary Examiner* — Mike Qi
(74) *Attorney, Agent, or Firm* — Staas & Halsey LLP (57) ABSTRACT

A light guide panel (LGP) for use in a liquid crystal display (LCD) apparatus includes a light-emitting pattern surface on which light-emitting patterns are formed, an opposite surface opposite to the light-emitting pattern surface, and four edge surfaces. Lenticular patterns are formed on one of the light-emitting pattern surface and the opposite surface. The light-emitting pattern surface includes a light-emitting part in which the light-emitting patterns are formed; and an edge part which extends along the four edge surfaces to enclose the light-emitting part and in which at least one fixing groove is formed to fix the LGP. The light-emitting part includes a pattern reducing region which faces the fixing groove and has a lower light-emitting pattern density than an other region of the light-emitting part.

30 Claims, 9 Drawing Sheets

LIGHT GUIDE PANEL AND LIQUID CRYSTAL DISPLAY APPARATUS HAVING PARTICULAR LIGHT-EMITTING PATTERN SURFACE

CROSS-REFERENCE TO RELATED APPLICATIONS

This application claims priority under 35 U.S.C. §119 from Korean Patent Application No. 10-2012-61590, filed on Jun. 8, 2012, in the Korean Intellectual Property Office, the disclosure of which is incorporated herein by reference in its entirety.

BACKGROUND

1. Field

The present general inventive concept generally relates to a light guide panel (LGP) and a liquid crystal display (LCD) apparatus including the same, and more particularly, to an LGP having lenticular patterns and an LCD apparatus including the same.

2. Description of the Related Art

In general, a liquid crystal display (LCD) apparatus includes a liquid crystal panel which displays an image and a backlight unit (BLU) which provides light to the liquid crystal panel. The liquid crystal panel and the BLU are packaged into one module (referred to as a liquid crystal module) through front and back chassis.

The BLU includes a plurality of light sources which generate light. The BLU also includes a light guide panel (LGP) which guides the light generated by the light sources to the liquid crystal panel.

Light-emitting patterns are formed on a side of the LGP to induce light to the liquid crystal panel. As a well-known method, if the LCD apparatus is a type capable of displaying a 3-dimensional (3D) image, lenticular patterns for increasing a 3D scanning effect are formed on a side or an other side of the LGP.

One or more fixing grooves may be formed in an edge of the LGP, and fixing members (e.g., studs) installed on the back chassis may be inserted into the fixing grooves in order to fix the LGP in its position on the back chassis.

Some of light leaks in a particular direction in the LGP due to the fixing grooves or the fixing member, i.e., a light leakage phenomenon (or a light bounce phenomenon), may occur due to the fixing grooves or the fixing members. An unintentional bright line may appear on the image displayed on the liquid crystal panel due to the light leakage phenomenon. This bright line deteriorates an image quality.

Due to characteristics of the lenticular patterns increasing a light straightness from the LGP to the liquid crystal panel, the LGP on which the lenticular patterns are formed more seriously lowers an image quality than a general LGP due to a light leakage.

In order to solve a light leakage problem, there have been suggested a method of attaching a black color tape onto an inner wall of a fixing groove, a method of attaching a white color tape in front of the fixing groove, etc.

However, these methods cause additional processes and thus operate as main factors in increasing manufacturing costs. Therefore, a method of solving a light leakage problem without increasing manufacturing costs or requiring additional manufacturing operations is required.

SUMMARY

Additional aspects and/or advantages will be set forth in part in the description which follows and, in part, will be apparent from the description, or may be learned by practice of the invention.

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a light guide panel (LGP) which solves a light leakage problem at low cost and a liquid crystal display (LCD) apparatus including the LGP.

According to an aspect of the exemplary embodiments, there is provided a light guide panel (LGP) for a liquid crystal display (LCD) apparatus which includes a light-emitting pattern surface on which light-emitting patterns are formed, an opposite surface opposite to the light-emitting pattern surface, and four edge surfaces, wherein lenticular patterns are formed on one of the light-emitting pattern surface and the opposite surface. The light-emitting pattern surface may include: a light-emitting part in which the light-emitting patterns are formed; and an edge part which extends along the four edge surfaces to enclose the light-emitting part and in which at least one fixing groove is formed to fix the LGP. The light-emitting part includes a pattern reducing region which faces the fixing groove and has a lower light-emitting pattern density than an other region of the light-emitting part.

The light-emitting pattern density may discontinuously change at a boundary between the pattern reducing region and the other region.

The pattern reducing region may not include any light-emitting pattern.

The light-emitting patterns may not be formed between the pattern reducing region and the fixing groove on the light-emitting pattern surface.

The pattern reducing region may be disposed to include a part of a boundary between the light-emitting part and the edge part.

The part of the boundary may include a point of the light-emitting part which is closest to the fixing groove.

The pattern reducing region may have a line symmetrical shape.

The pattern reducing region may have one of a semicircular shape, a semielliptical shape, a polygonal shape, and a tilted polygonal shape.

An area of the pattern reducing region may be up to about 5 times an area occupied by the fixing groove in the light-emitting pattern surface.

The area of the pattern reducing region may be about 2 times the area occupied by the fixing groove in the light-emitting pattern surface.

The edge part of the light-emitting pattern surface may include first and second additional pattern regions which are respectively disposed beside right and left sides of the fixing groove and in which additional light-emitting patterns are formed.

The first and second additional pattern regions may have rectangular shapes.

A ratio between a width and a height of each of the first and second additional pattern regions may be in a range between 1:1 and 4:1.

The LGP may receive light through one of the four edge surfaces. The fixing groove may be formed in one of two edge surfaces neighboring to the edge surface receiving light. One of the first and second additional pattern regions closer to the edge surface receiving the light may be wider than the other one of the first and second additional pattern regions.

The LGP may receive light through two of the four edge surfaces which are opposite to each other. The fixing groove may be formed in one of two other edge surfaces which do not receive light. The first and second additional pattern regions may have the same shapes and sizes.

The light-emitting part of the light-emitting pattern surface may further include first and second pattern increasing regions which are respectively disposed beside right and left sides of the pattern reducing region and have higher light-emitting pattern densities than adjacent regions.

The light-emitting part may further include a back pattern increasing region which is disposed right after the pattern reducing region and has a higher light-emitting pattern density than adjacent regions.

The back pattern increasing region may be disposed to enclose a part of the pattern reducing region.

According to another aspect of the exemplary embodiments, there is provided an LCD apparatus including the LGP.

BRIEF DESCRIPTION OF THE DRAWINGS

The above and/or other aspects will be more apparent by describing certain exemplary embodiments with reference to the accompanying drawings, in which.

DETAILED DESCRIPTION

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
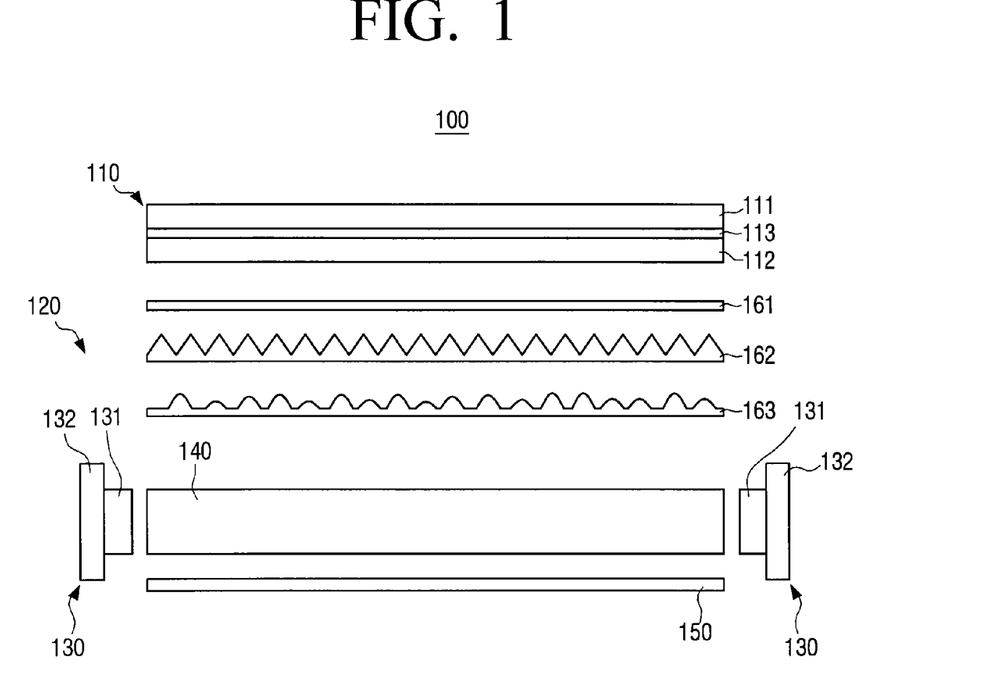
FIG. 1 is a schematic cross-sectional view illustrating a liquid crystal display (LCD) apparatus according to an exemplary embodiment of the present general inventive concept.

FIG. 1 is a schematic cross-sectional view illustrating a liquid crystal display (LCD) apparatus 100 according to an exemplary embodiment of the present general inventive concept. For the descriptive convenience, main elements of the LCD apparatus 100 are illustrated in FIG. 1.

Referring to FIG. 1, the LCD apparatus 100 includes a liquid crystal panel 110 and a backlight unit (BLU) 120. Although not shown in FIG. 1, the liquid crystal panel 110 and the BLU 120 are packaged into one module through front and back chassis.

The liquid crystal panel 110 is a part which displays an image and includes an upper plate 111, a lower plate 112, and a liquid crystal 113 housed between the upper and lower plates 111 and 112. Although not shown in FIG. 1, the upper plate 111 includes a front polarizing filter, a color filter layer, etc., and the lower plate 112 includes a back polarizing filter, a thin film transistor (TFT) array, etc. The liquid crystal 113 is driven according to a switching operation of the TFT array in order to display an image from the liquid crystal panel 110. The liquid crystal panel 110 is well known, and thus its detailed description will be omitted herein.

The BLU 120 provides the liquid crystal panel 110 with light which is to display the image. Therefore, the BLU 120 includes two light source units 130, a light guide panel (LGP) 140 disposed between the two light source units 130, a reflector sheet 150 disposed in the rear of the LGP 140, and a plurality of optical sheets 161, 162, and 163 disposed in front of the LGP 140.

Each of the light source units 130 includes a light source driving board 132 and a plurality of light sources 131 installed on a side of the light source driving board 132. The light source driving board 132 drives the light sources 131, and the light sources 131 emit light into the LGP 140. For example, the light sources 131 may be light-emitting diodes (LEDs). In the present exemplary embodiment, the two light source units 130 are installed. However, in other alternative exemplary embodiments, only one light source unit 130 may be installed.

The reflector sheet 150 assists the LGP 140 in guiding the light to the liquid crystal panel 110. The plurality of optical sheets 161, 162, and 163 diffuse and collimate the light emitted from the LGP 140 in order to increase brightness uniformity. Kinds and arrangements of the optical sheets 161, 162, and 163 may be variously selected. For example, a protection sheet 161, a prism sheet 162, and a diffusion sheet 163 may be arranged as optical sheets.

Figure 2:
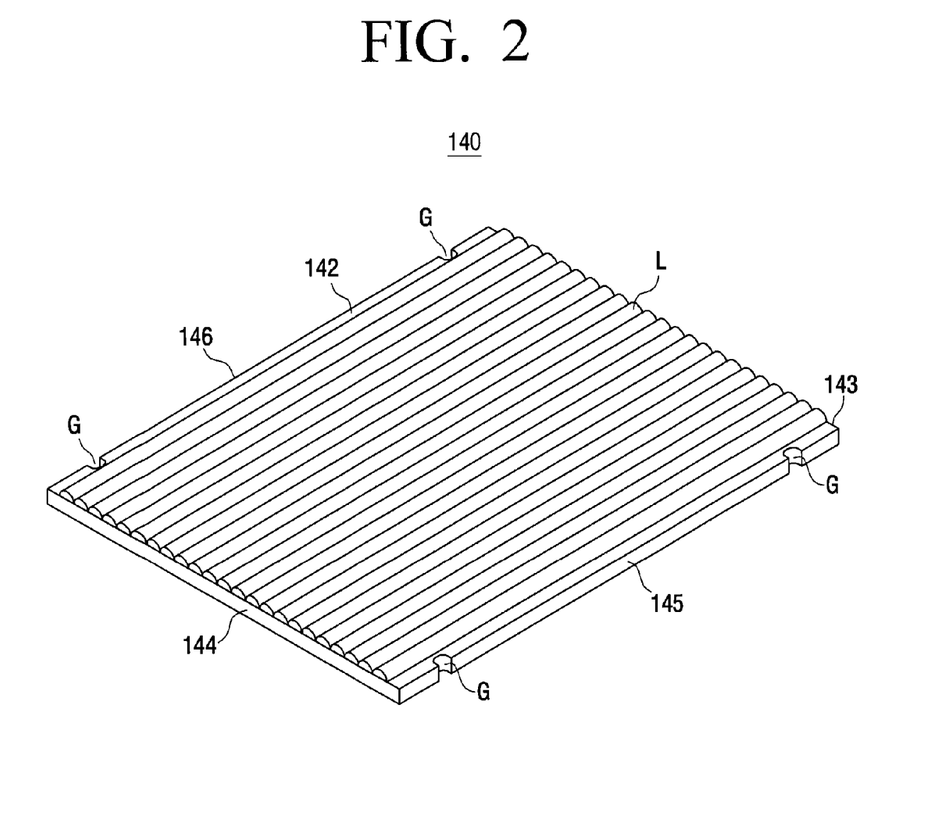
FIG. 2 is a perspective view of a light guide panel (LGP) of the LCD apparatus of FIG. 1.
Figure 3:
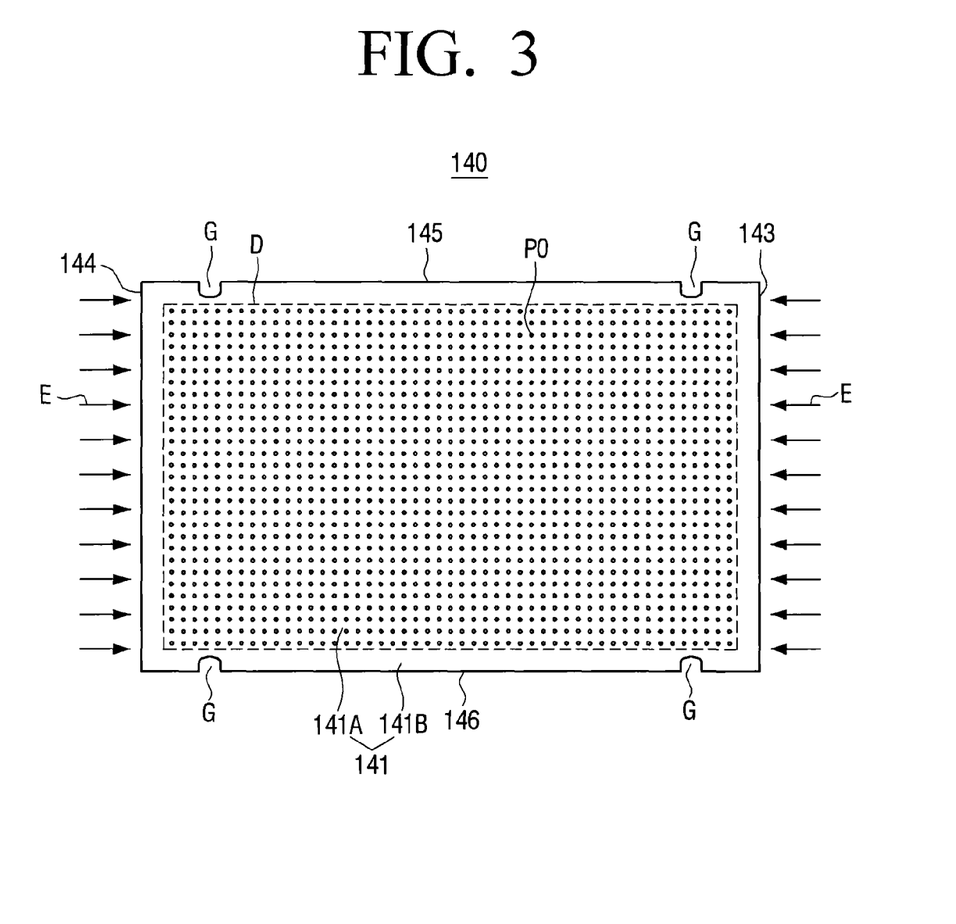
FIG. 3 is a plan view illustrating a back side of the LGP of the LCD apparatus of FIG. 1.

The LGP 140 will now be described in more detail with reference to FIGS. 2 and 3. FIG. 2 is a perspective view of the LGP 140 of the LCD apparatus 100 of FIG. 1. FIG. 3 is a plan view illustrating a back side of the LGP 140 of the LCD apparatus 100 of FIG. 1

Referring to FIGS. 2 and 3, the LGP 140 has an approximately rectangular panel shape. The LGP 140 includes a light-emitting pattern surface 141 on which light-emitting patterns P0 are formed, a lenticular pattern surface 142 which is disposed opposite to the light-emitting pattern surface 141 and on which lenticular patterns L are formed, and four edge surfaces 143, 144, 145, and 146 which disclose the light-emitting pattern surface 141 and the lenticular pattern surface 142.

For descriptive convenience, the four edge surfaces 143, 144, 145, and 146 are respectively referred to as first, second, third, and fourth edge surfaces. The first and second edge surfaces 143 and 144 are opposite to each other, and the third and fourth edge surfaces 145 and 146 are opposite to each other. Each of the first, second, third, and fourth edge surfaces 143, 144, 145, and 146 is adjacent to two other edge surfaces. For example, the first edge surface 143 is adjacent to the third and fourth edge surfaces 145 and 146.

The light-emitting pattern surface 141 includes a light-emitting part 141A on which the light-emitting patterns P0 are formed and an edge part 141B which extends along the first, second, third, and fourth edge surfaces 143, 144, 145, and 146 to enclose the light-emitting part 141A. Here, a virtual line, i.e., a dotted line D, denotes a boundary between the light-emitting part 141A and the edge part 141B or an edge of the light-emitting part 141A.

Light E is incident into the LGP 140 through the first and second edge surfaces 143 and 144 and then is guided to the liquid crystal panel 110 of FIG. 1 through the light-emitting patterns P0 formed on the light-emitting pattern surface 141.

Shapes, sizes, arrangements, etc. of the light-emitting patterns P0 of FIG. 3 are exemplary and thus may be variously changed. The light-emitting patterns P0 may be formed by a printing process or a laser etching process.

The lenticular patterns L formed on the lenticular pattern surface 142 increases a straightness of light emitted from the LGP 140 to the liquid crystal panel 110 to improve 3-dimensinoal (3D) scanning efficiency when realizing a 3D image. The lenticular patterns L are well known, and thus their detailed descriptions will be omitted herein.

Two fixing grooves G are formed in each of the third and fourth edge surfaces 145 and 146 to be concave inwards of the LGP 140. In other words, a plurality of fixing grooves G are formed in the edge part 141B of the light-emitting pattern surface 141 and respectively extend to the lenticular pattern surface 142 opposite to the fixing grooves G as shown in FIG. 2. Shapes of the fixing grooves G are exemplary and thus may be changed according to exemplary embodiments.

Fixing members (e.g., studs) are installed on the back chassis (not shown) to fix the LGP 140 and are respectively inserted into the fixing grooves G to fix the LGP 140 in its position on the back chassis.

In the present exemplary embodiment, the fixing grooves G are formed in the third and fourth edge surfaces 145 and 146. However, in the alternative exemplary embodiments, the fixing grooves G may be formed in the first and second edge surfaces 143 and 144. In the present exemplary embodiment, two fixing grooves G are formed in each of the third and fourth edge surfaces 145 and 146. In the alternative exemplary embodiments, the number of fixing grooves G formed in each of the third and fourth edge surfaces 145 and 146 may be variously changed. For example, only one fixing groove G may be formed in each of the third and fourth edge surfaces 145 and 146.

As described above, a light leakage phenomenon deteriorating a quality of an image may occur due to the fixing grooves G or the fixing members. The light leakage phenomenon causes a greater problem when using the LGP 140 having the lenticular patterns L than when using a general LGP.

Exemplary embodiments for illustrating designs of light-emitting patterns which are formed around the fixing grooves to prevent such a light leakage will now be described with reference to FIGS. 4 through 9. FIGS. 4 through 9 are views illustrating designs of light-emitting patterns formed around of fixing grooves according to various exemplary embodiments of the present general inventive concept.

Figure 4:
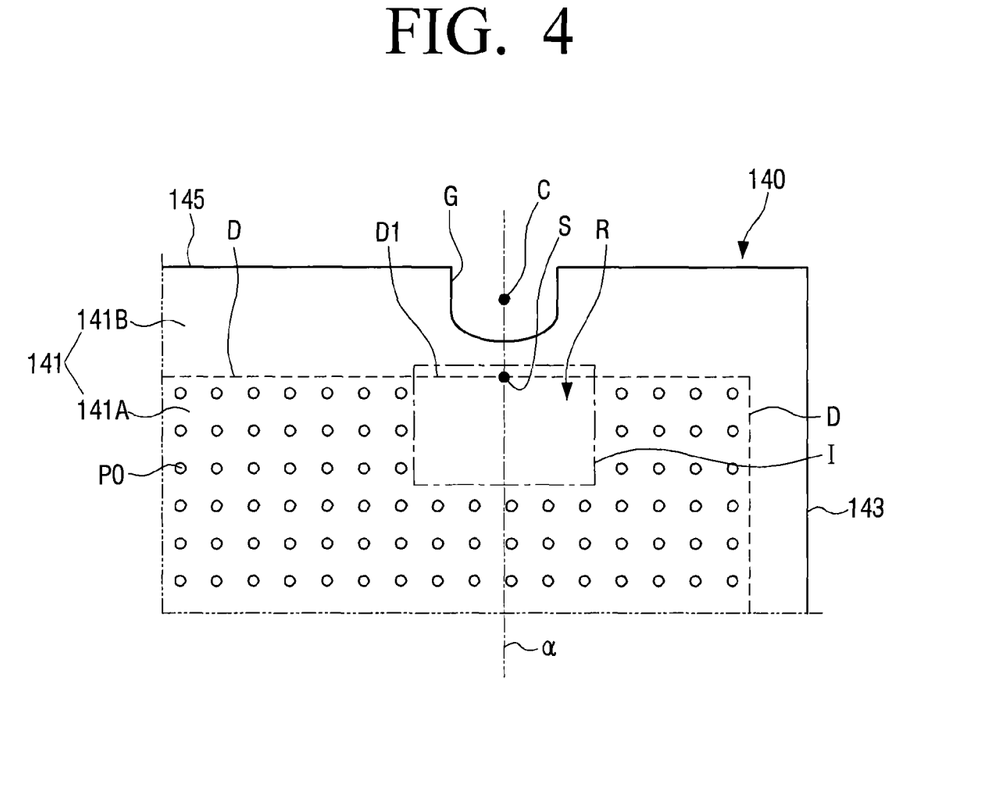
FIGS. 4 through 9 are views illustrating designs of light-emitting patterns formed around a fixing groove according to various exemplary embodiments of the present general inventive concept.

The exemplary embodiment of FIG. 4 will be first described.

As described above, the light-emitting pattern surface 141 of the LGP 140 includes the light-emitting part 141A and the edge part 141B. Referring to FIG. 4, the light-emitting part 141A includes a pattern reducing region R adjacent to the fixing groove G.

The pattern reducing region R has a noticeably lower light-emitting pattern density than an other region of the light-emitting part 141A. As shown in FIG. 4, a light-emitting pattern may not even exist in the pattern reducing region R. Therefore, when a light-emitting pattern density is measured from an outside of the pattern reducing region R into the pattern reducing region R, the light-emitting pattern density is rapidly reduced at a border I of the pattern reducing region R. Therefore, the light-emitting pattern density discontinuously changes at the border I of the pattern reducing region R.

The pattern reducing region R faces the fixing groove G. The pattern reducing region R includes a part D1 of a boundary D between the light-emitting part 141A and the edge part 141B. The part D1 of the boundary D included in the pattern reducing region R includes a point S which is closest to the fixing groove G in the light-emitting part 141A.

The pattern reducing region R may be formed in various shapes. As shown in FIG. 4, the pattern reducing region R may have a rectangular shape which is a kind of line symmetrical shape. In other words, the pattern reducing region R is symmetric with respect to a straight line a going through a center C of the fixing groove G and the point S. The pattern reducing region R may have another line symmetrical shape such as a semicircular shape, a semielliptical shape, an isosceles triangular shape, or the like. The pattern reducing region R may another shape such as a tilted polygonal shape not the line symmetrical shape.

An area of the pattern reducing region R may be determined in a range up to about 5 times an area of the fixing groove G in the light-emitting pattern surface 141 and may be two times an area occupied by the fixing groove G.

A light-emitting pattern may not exist in a region between the fixing groove G and the pattern reducing region R.

Due to the pattern reducing region R formed around the fixing groove G, an amount of light, which is reflected or scattered from the fixing groove G or a fixing member (not shown) and then emitted from the LGP 140, can be reduced. Therefore, the problem of a light leakage phenomenon occurring due to the fixing groove G or the fixing member can be solved. As a result, a quality of an image is improved.

The exemplary embodiment of FIG. 5 will now be described.

Figure 5:
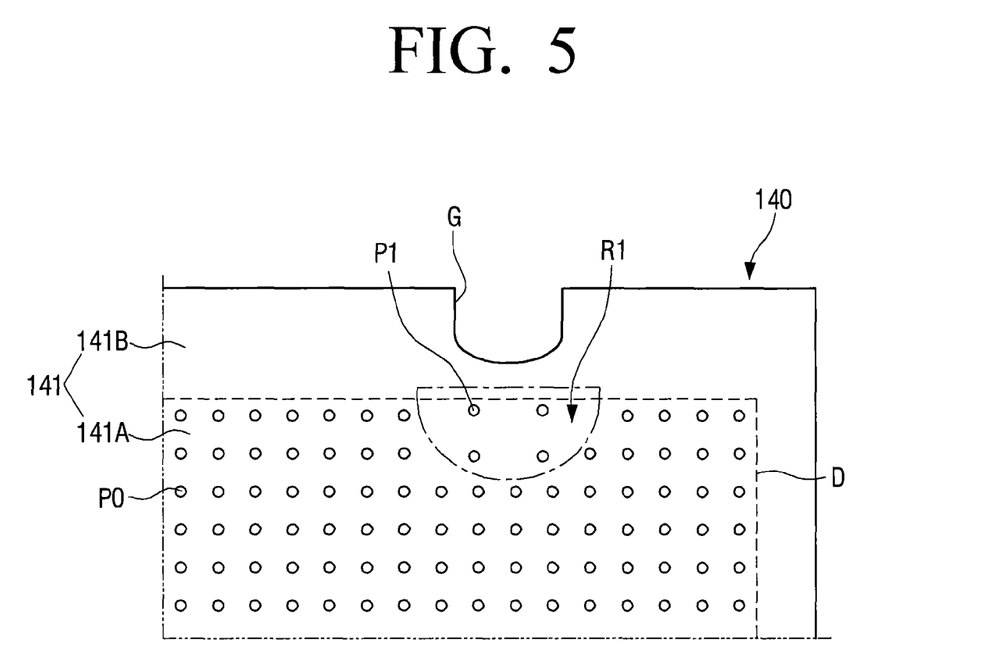

Referring to FIG. 5, a pattern reducing region R1 has a semielliptical shape. Differently from the pattern reducing region R of FIG. 4, light-emitting patterns P1 are formed in the pattern reducing region R1. The pattern reducing region R1 has a noticeably lower light-emitting pattern density than an other region of the light-emitting pattern surface 141. For example, a pitch between the light-emitting patterns P1 in the pattern reducing region R1 may be reduced or sizes of the light-emitting patterns P1 may be reduced to lower a density of the pattern reducing region R1 than a density of an other region.

The exemplary embodiment of FIG. 6 will now be described.

Figure 6:
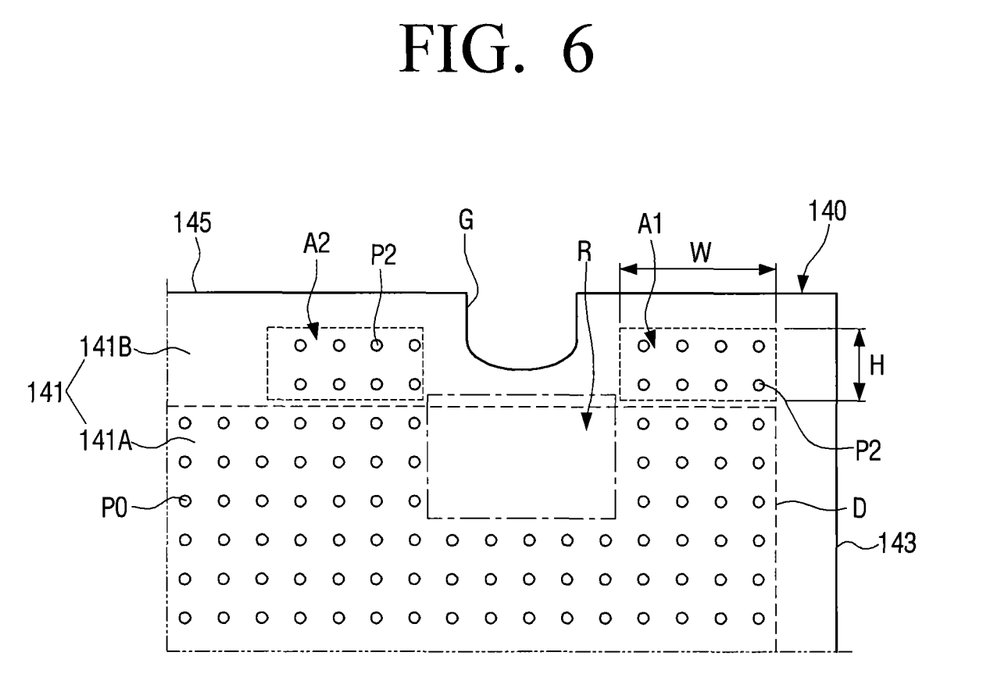

As shown in FIG. 6, first and second additional pattern regions A1 and A2 are respectively formed beside the right and left sides of the fixing groove G on the edge part 141B of the light-emitting pattern surface 141. Additional patterns P2 are formed in the first and second additional pattern regions A1 and A2. As shown in FIG. 6, the first and second additional pattern regions A1 and A2 have rectangular shapes. In this case, a ratio between a width W and a height H of each of the first and second additional pattern regions A1 and A2 may be selected in a range between 1:1 and 4:1. However, the first and second additional pattern regions A1 and A2 are not limited to the rectangular shapes and thus may have other alternative shapes.

The first and second additional pattern regions A1 and A2 are formed beside the right and left sides of the fixing groove G as described above to reduce an amount of light which is incident into the LGP 140 through the first and second edge surfaces 143 and 144 (see FIG. 6) and then reaches the fixing groove G. Therefore, the light leakage phenomenon occurring due to the fixing groove G or the fixing member can be further attenuated.

In FIG. 6, the first and second additional pattern regions A1 and A2 have the same shapes and sizes. This is particularly appropriate for a case where the LGP 140 receives light through the first and second edge surfaces 143 and 144 as shown in FIG. 3. If the LGP 140 receives light only through the first edge surface 143, a dark region may appear around the first additional pattern region A1 due to the first additional pattern region A1. Therefore, in this case, an area of the second additional pattern region A2 may be greater than an area of the first additional pattern region A1. In other words, it is desirable that the second additional pattern region A2 is wider than the first additional pattern region A1 closer to the first edge surface 143, if the LGP 140 receives light only through the first edge surface 143.

The exemplary embodiment of FIG. 7 will now be described.

Figure 7:
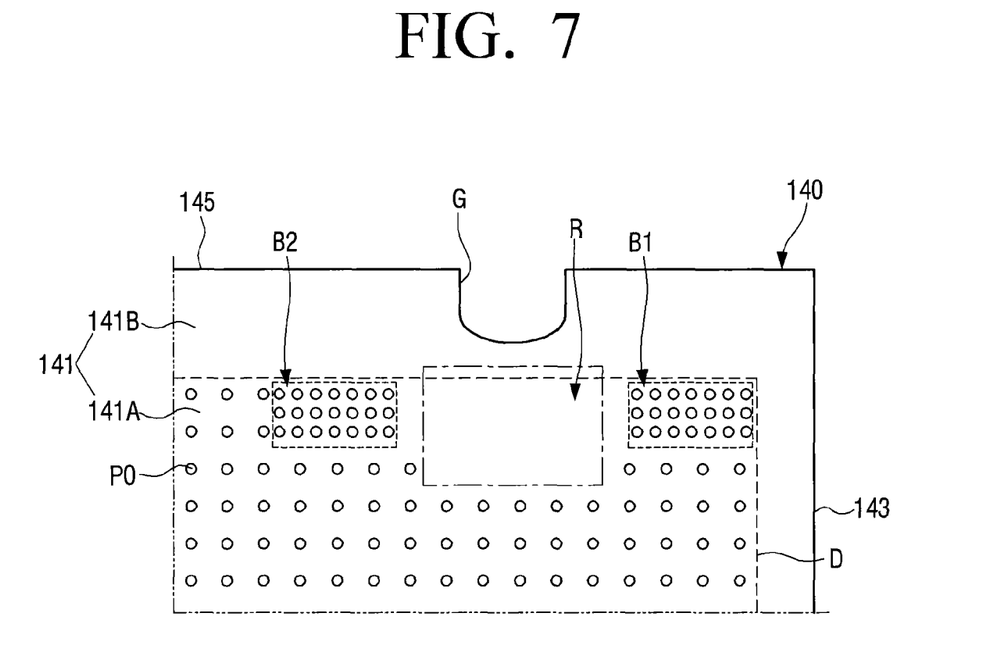

Referring to FIG. 7, first and second pattern increasing regions B1 and B2 are formed beside right and left sides of the pattern reducing region R in the light-emitting part 141A of the light-emitting pattern surface 141. The first and second pattern increasing regions B2 and B2 has higher light-emitting pattern densities than the other region of the light-emitting part 141A in which the light-emitting patterns P0 are formed.

Similarly to the first and second additional pattern regions A1 and A2, the first and second pattern increasing regions B1 and B2 reduce an amount of light which is incident into the LGP 140 and then reaches the fixing groove G. Therefore, a light leakage phenomenon occurring due to the fixing groove G or the fixing member can be further attenuated.

The first and second pattern increasing regions B1 and B2 remove a dark region which may appear beside one side of the pattern reducing region R. For example, if the LGP 140 receives light only through the first edge surface 143, the second pattern increasing region B2 removes the dark region appearing beside the left side of the pattern reducing region R, due to the first pattern increasing region B1 having a high light-emitting pattern density. In order to secure the removal of the dark region appearing due to the first pattern increasing region B1, the second pattern increasing region B2 may be wider than the first pattern increasing region B1 closer to the first edge surface 143.

The first and second pattern increasing regions B1 and B2 have rectangular shapes in FIG. 7 but may have other alternative shapes. For example, the first and second pattern increasing regions B1 and B2 may have right triangular shapes alongside the first edge surface 143.

The exemplary embodiment of FIG. 8 will now be described.

Figure 8:
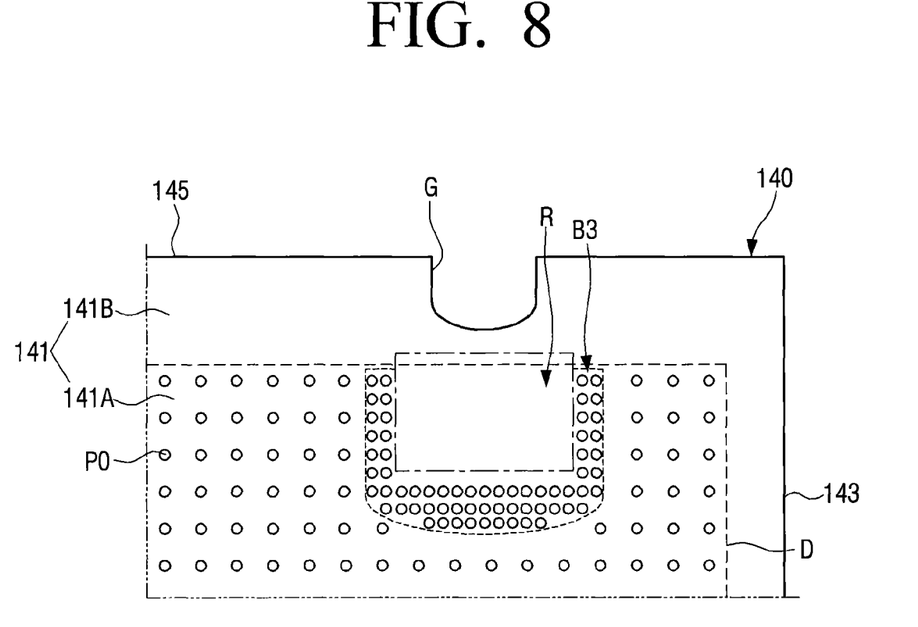

Referring to FIG. 8, a back pattern increasing region B3 is formed right after the pattern reducing region R in the light-emitting part 141A of the light-emitting pattern surface 141. Similarly to the first and second pattern increasing regions B1 and B2, the back pattern increasing region B3 has a higher light-emitting pattern density than the other region of the light-emitting part 141A in which the light-emitting patterns P0 are formed. As shown in FIG. 8, the back pattern increasing region B3 has a shape which encloses at least a part of the pattern reducing region R. The back pattern increasing region B3 removes a dark region which may appear around the pattern reducing region R due to the pattern reducing region R.

The exemplary embodiment of FIG. 9 will now be described.

Figure 9:
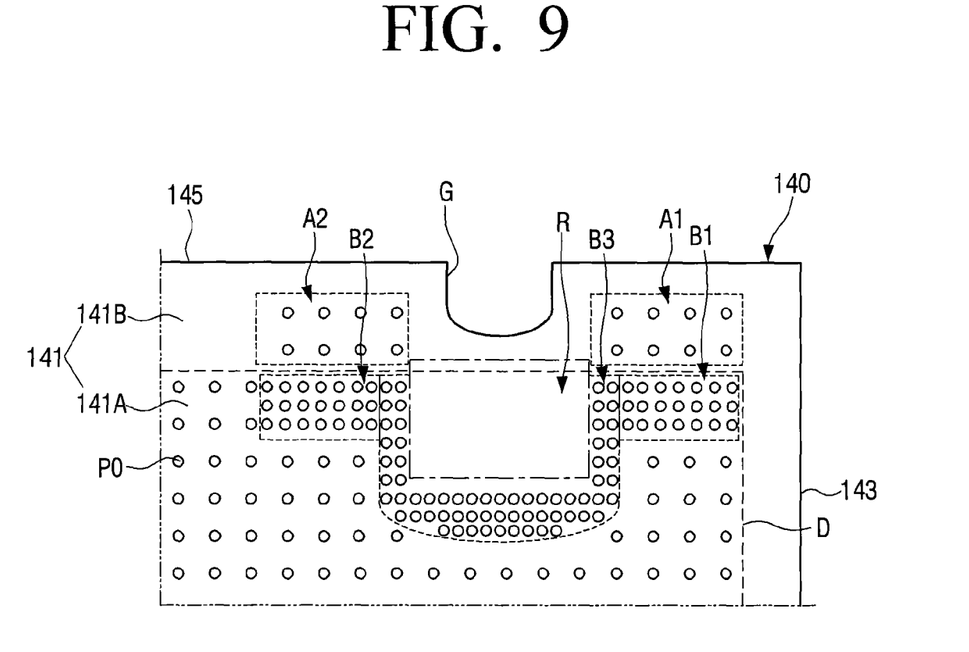

In the exemplary embodiment of FIG. 9, light-emitting patterns are formed around the fixing groove G all in the pattern reducing region R, the first and second additional pattern regions A1 and A2, the first and second pattern increasing regions B1 and B2, and the back pattern increasing region B3. According to this exemplary embodiment, a light leakage phenomenon occurring due to the fixing groove G and the fixing member is prevented due to the pattern reducing region R, the first and second additional pattern regions A1 and A, and the first and second pattern increasing regions B1 and B2. Also, a dark region which may appear around the pattern reducing region R can be prevented due to the first and second pattern increasing regions B1 and B2 and the back pattern increasing region B3.

As described above, according to the LGP 140 according to the exemplary embodiments of the present general inventive concept, a light leakage problem occurring due to the fixing groove G and the fixing member can be solved. This solution is achieved only through a change of a design of light-emitting patterns without an additional process. Therefore, the light leakage problem can be solved at lower cost than in the conventional art.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light guide panel (LGP) for a liquid crystal display (LCD) apparatus, comprising:
   a light-emitting pattern surface on which light-emitting patterns are formed;
   an opposite surface opposite to the light-emitting pattern surface; and
   four edge surfaces,
   wherein lenticular patterns are formed on one of the light-emitting pattern surface and the opposite surface,
   wherein the light-emitting pattern surface comprises:
   a light-emitting part in which the light-emitting patterns are formed; and
   an edge part which extends along the four edge surfaces to enclose the light-emitting part and in which at least one fixing groove is formed to fix the LGP,
   wherein the light-emitting part comprises a pattern reducing region which is located proximate to the fixing groove and has no light-emitting pattern or a lower light-emitting pattern density than an other region of the light-emitting part.

2. The LGP of claim 1, wherein the light-emitting pattern density discontinuously changes at a boundary between the pattern reducing region and the other region.

3. The LGP of claim 1, wherein the pattern reducing region extends inwardly a predefined distance from a boundary D defined between the light-emitting part and the edge part at a location proximate to the fixing groove.

4. The LGP of claim 1, wherein the pattern reducing region extends inwardly a predefined distance from a boundary D defined between the light-emitting part and the edge part at a location proximate to the fixing groove such that the pattern reducing region is symmetric with respect to a straight line a going through a center C of the fixing groove G and a point S.

5. The LGP of claim 1, wherein the pattern reducing region is positioned to encompass a part of a boundary between the light-emitting part and the edge part.

6. The LGP of claim 5, wherein the part of the boundary comprises a point of the light-emitting part which is closest to the fixing groove.

7. The LGP of claim 1, wherein the pattern reducing region has a line symmetrical shape.

8. The LGP of claim 1, wherein the pattern reducing region has one of a semicircular shape, a semielliptical shape, a polygonal shape, and a tilted polygonal shape.

9. The LGP of claim 1, wherein an area of the pattern reducing region is up to about 5 times an area occupied by the fixing groove in the light-emitting pattern surface.

10. The LGP of claim 9, wherein the area of the pattern reducing region is about 2 times the area occupied by the fixing groove in the light-emitting pattern surface.

11. The LGP of claim 1, wherein the edge part of the light-emitting pattern surface comprises first and second additional pattern regions which are respectively disposed beside right and left sides of the fixing groove and in which additional light-emitting patterns are formed.

12. The LGP of claim 11, wherein the first and second additional pattern regions have rectangular shapes.

13. The LGP of claim 12, wherein a ratio between a width and a height of each of the first and second additional pattern regions is in a range between 1:1 and 4:1.

14. The LGP of claim 11, wherein:
the LGP receives light through one of the four edge surfaces, and the fixing groove is formed in one of two edge surfaces neighboring to the edge surface receiving light, and
one of the first and second additional pattern regions closer to the edge surface receiving the light is wider than the other one of the first and second additional pattern regions.

15. The LGP of claim 11, wherein:
the LGP receives light through two of the four edge surfaces which are opposite to each other, and the fixing groove is formed in one of two other edge surfaces which do not receive light; and
the first and second additional pattern regions have the same shapes and sizes.

16. The LGP of claim 11, wherein the light-emitting part of the light-emitting pattern surface further comprises first and second pattern increasing regions which are respectively disposed beside right and left sides of the pattern reducing region and have higher light-emitting pattern densities than adjacent regions.

17. The LGP of claim 16, wherein the light-emitting part further comprises a back pattern increasing region which is disposed right after the pattern reducing region and has a higher light-emitting pattern density than adjacent regions.

18. The LGP of claim 1, wherein the light-emitting part of the light-emitting pattern surface comprises first and second pattern increasing regions which are respectively disposed beside right and left sides of the pattern reducing region and have higher light-emitting pattern densities than adjacent regions.

19. The LGP of claim 18, wherein:
the LGP receives light through one of the four edge surfaces, and the fixing groove is formed in one of two edge surfaces neighboring to the edge surface receiving light, and
one of the first and second pattern increasing regions closer to the edge surface receiving the light is wider than the other one of the first and second pattern increasing regions.

20. The LGP of claim 18, wherein:
the LGP receives light through two of the four edge surfaces opposite to each other, and the fixing groove is formed in one of the other two edge surfaces which do not receive light; and
the first and second pattern increasing regions have the same shapes and sizes.

21. The LGP of claim 1, wherein the light-emitting part further comprises a back pattern increasing region which is disposed right after the pattern reducing region and has a higher light-emitting pattern density than adjacent regions.

22. The LGP of claim 21, wherein the back pattern increasing region is disposed to enclose a part of the pattern reducing region.

23. An LCD apparatus comprising:
a liquid crystal panel;
at least one light source unit; and
a light guide panel (LGP) which guides light generated by the light source unit to the liquid crystal panel, wherein the LGP comprises:
a light-emitting pattern surface on which light-emitting patterns are formed;
an opposite surface which is disposed opposite to the light-emitting pattern surface; and
four edge surfaces,
wherein lenticular patterns are formed on one of the light-emitting pattern surface and the opposite surface,
wherein the light-emitting pattern surface comprises:
a light-emitting part in which the light-emitting patterns are formed, and
an edge part which extends along the four edge surfaces to enclose the light emitting part and in which at least one fixing groove is formed to fix the LGP,
wherein the light-emitting part comprises a pattern reducing region which is located proximate to the fixing groove and has no light-emitting pattern or a lower light-emitting pattern density than an other region of the light-emitting part.

24. The LCD apparatus of claim 23, wherein the pattern reducing region extends inwardly a predefined distance from a boundary D defined between the light-emitting part and the edge part at a location proximate to the fixing groove.

25. The LCD apparatus of claim 23, wherein the pattern reducing region extends inwardly a predefined distance from a boundary D defined between the light-emitting part and the edge part at a location proximate to the fixing groove such that the pattern reducing region is symmetric with respect to a straight line a going through a center C of the fixing groove G and a point S.

26. A display apparatus comprising:
a liquid crystal display panel;
at least one light source unit; and
a light guide panel (LGP) configured to guide light generated by the light source unit to the liquid crystal display panel, the LGP having a front surface on which light-emitting patterns are formed and at least one opening formed on a side edge of the LGP,
wherein the light-emitting patterns are formed within a boundary D of a light-emitting pattern region with at least one pattern reduction region extending inwardly a predefined distance from the boundary D at a location proximate to the at least one opening, the at least one pattern reduction region having no light-emitting pattern or a lower light-emitting pattern density than a central area of the light-emitting pattern region.

27. The display apparatus of claim 26, wherein the predefined distance associated with the pattern reduction region is selected to reduce image quality deterioration caused by light leakage occurring at the opening.

28. The display apparatus of claim 26, wherein the at least one opening comprises a plurality of fixing grooves formed on two or more of side edges of the LGP, the fixing grooves configured to receive a plurality of studs installed on a chassis.

29. The display apparatus of claim 26, wherein the boundary D comprises a rectangular boundary separating the light-emitting pattern region from an edge region.

30. The display apparatus of claim 26, wherein lenticular patterns are formed on at least one of the front surface and a rear surface of the LGP.

\* \* \* \* \*

UNITED STATES PATENT AND TRADEMARK OFFICE
CERTIFICATE OF CORRECTION

PATENT NO. : 8,451,400 B1
APPLICATION NO. : 13/693487
DATED : May 28, 2013
INVENTOR(S) : Sin-wook Hyung et al.

It is certified that error appears in the above-identified patent and that said Letters Patent is hereby corrected as shown below:

In the Claims:

In Col. 8, Line 55, In Claim 4, delete "line a" and insert -- line α --, therefor.

In Col. 10, Line 41, In Claim 25, delete "line a" and insert -- line α --, therefor.

Signed and Sealed this
Eighth Day of October, 2013

Teresa Stanek Rea
*Deputy Director of the United States Patent and Trademark Office*